(12) United States Patent
Hosotani et al.

(10) Patent No.: US 12,282,374 B2
(45) Date of Patent: Apr. 22, 2025

(54) ELECTRONIC CARD

(71) Applicant: Murata Manufacturing Co., Ltd., Kyoto-fu (JP)

(72) Inventors: Tatsuya Hosotani, Nagaokakyo (JP); Kiyokazu Yamada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 36 days.

(21) Appl. No.: 18/315,435

(22) Filed: May 10, 2023

(65) Prior Publication Data

US 2023/0280813 A1 Sep. 7, 2023

Related U.S. Application Data

(63) Continuation of application No. PCT/JP2021/040476, filed on Nov. 3, 2021.

(30) Foreign Application Priority Data

Nov. 16, 2020 (JP) ................................. 2020-190090

(51) Int. Cl.
*G06F 1/32* (2019.01)
*G06F 1/3231* (2019.01)

(52) U.S. Cl.
CPC .................................. *G06F 1/3231* (2013.01)

(58) Field of Classification Search
CPC ................. G06F 1/12; G06F 9/44; G06F 1/32
See application file for complete search history.

(56) References Cited

U.S. PATENT DOCUMENTS

| 10,402,712 B1 * | 9/2019 | Cheng | ............... G06K 19/07354 |
| 2022/0015033 A1 * | 1/2022 | Xu | .................... H04W 52/0229 |

FOREIGN PATENT DOCUMENTS

| JP | H05-333966 A | 12/1993 |
| JP | 2004-535640 A | 11/2004 |
| JP | 2006-178770 A | 7/2006 |
| JP | 2009-031877 A | 2/2009 |
| JP | 2012-238126 A | 12/2012 |
| JP | 2016-115028 A | 6/2016 |

(Continued)

OTHER PUBLICATIONS

International Search Report issued in PCT/JP2021/040476; mailed Jan. 25, 2022.

*Primary Examiner* — Keshab R Pandey
(74) *Attorney, Agent, or Firm* — Studebaker Brackett PLLC

(57) ABSTRACT

An electronic card includes an electric storage device, a charging circuit, a wireless communication circuit, a processor, an electronic function circuit, a power management circuit, and a wakeup circuit configured to start the power management circuit upon receiving an external trigger. The power management circuit supplies, after being started by the wakeup circuit, power of the electric storage device to the processor and the electronic function circuit. The processor stores, before the start of wireless communication, an operation state or an output result of the electronic function circuit which is obtained by an operation with power of the electric storage device, and causes, after operation processing of the electronic function circuit, the wireless communication circuit to start the wireless communication.

20 Claims, 3 Drawing Sheets

(56) References Cited

FOREIGN PATENT DOCUMENTS

| | | |
|---|---|---|
| JP | 2016-118029 A | 6/2016 |
| JP | 2018-157430 A | 10/2018 |
| WO | 2009/008411 A1 | 1/2009 |

\* cited by examiner

ELECTRONIC CARD

CROSS-REFERENCE TO RELATED APPLICATIONS

This application claims benefit of priority to International Patent Application No. PCT/JP2021/040476, filed Nov. 3, 2021, and to Japanese Patent Application No. 2020-190090, filed Nov. 16, 2020, the entire contents of each are incorporated herein by reference.

BACKGROUND

Technical Field

The present disclosure relates to an electronic card including an electric storage device, an electronic function circuit, and a processor.

Background Art

Intelligent electronic cards have been recently proposed which support near field communication (NFC) and each include an electronic function circuit and a processor for performing a biometric authentication function for security improvement or a display function. For wireless power reception, there is a technique using an external magnetic field, such as NFC.

Japanese Unexamined Patent Application Publication No. 2012-238126 discloses, as an example of an electronic card including an electric storage device and an electronic function circuit, an electronic card for fingerprint authentication. This electronic card includes a fingerprint reading sensor and is configured to store power supplied from a reader in an electric storage circuit, discharge power to a device control circuit and a fingerprint processing circuit when the output voltage of the electric storage circuit reaches a predetermined value, enable transmission/reception between itself and the reader when fingerprint authentication has been successfully performed, disable transmission/reception between itself and the reader thereafter, and stop discharging power to the device control circuit and the fingerprint processing circuit.

SUMMARY

Since the intensity of an external magnetic field generated by a communication device such as an NFC transmission device is not high, it is difficult to wirelessly receive sufficient power. Accordingly, various problems arise that the electronic function circuit that has a large power consumption cannot be operated, stable wireless communication cannot be performed because of the electromagnetic interference between wireless power reception and wireless communication, a communication distance cannot be ensured, an operation processing time cannot be shortened, and operation processing cannot be smoothly performed.

Specifically, the following problems arise. The improvements in stable communication performance, usability, and security cannot be achieved at the same time.

In the case where sufficient power cannot be obtained from a reader/writer, for example, the operation time (e.g., communication time for authentication) of the electronic function circuit increases and the time that it takes to pass an electronic card over the reader/writer increases. Thus, usability of the electronic card is impaired.

The simultaneous operations of the wireless power reception circuit and the wireless communication circuit lead to the mutual electromagnetic interference between them and the occurrence of a malfunction. The short wireless communication distance leads to unstable wireless communication.

Since the electronic function circuit consumes power even when the electronic card is not used, the amount of standby power is large and the operation time of the electronic card which is obtained by use of the electric storage device is short.

The level of security of, for example, a security card having a security function decreases because the operation state of the electronic function circuit is maintained. The power consumption of, for example, an electronic display card having a display function increases because the display state of the electronic display card is maintained.

Accordingly, the present disclosure provides an electronic card including a processor with which the operation processing time of an electronic function circuit is shortened, the operation processing of the electronic function circuit is smoothly performed, the amount of standby power is reduced to increase an operation time, and both the improvements in usability and security or both the improvement in usability and the reduction in the amount of power consumption are achieved.

An electronic card that is an example of the present disclosure includes an electric storage device, a charging circuit configured to charge the electric storage device, a wireless communication circuit configured to perform wireless communication with an external device, a processor that is connected to the wireless communication circuit and is configured to receive/output a signal, an electronic function circuit that is connected to the processor and is configured to receive/output a signal, a power management circuit configured to supply power to each unit, and a wakeup circuit configured to start the power management circuit upon receiving an external trigger. The power management circuit supplies, after being started, power of the electric storage device to the processor and the electronic function circuit. The processor stores, before the start of the wireless communication, an operation state or an output result of the electronic function circuit which is obtained by an operation with power of the electric storage device, and causes, after ending an operation of the electronic function circuit, the wireless communication circuit to start the wireless communication.

With the above configuration, the wakeup circuit starts the power management circuit upon receiving the external trigger. After this start, the processor and the electronic function circuit operate with power of the electric storage device. The processor stores an operation state or an output result of the electronic function circuit which is obtained by an operation with power of the electric storage device for a predetermined period.

According to the present disclosure, there can be provided an electronic card including a processor with which the operation processing time of an electronic function circuit is shortened, the operation processing of the electronic function circuit is smoothly performed, the amount of standby power is reduced to increase an operation time, and both the improvements in usability and security or both the improvement in usability and the reduction in the amount of power consumption are achieved.

DETAILED DESCRIPTION

Figure 1:
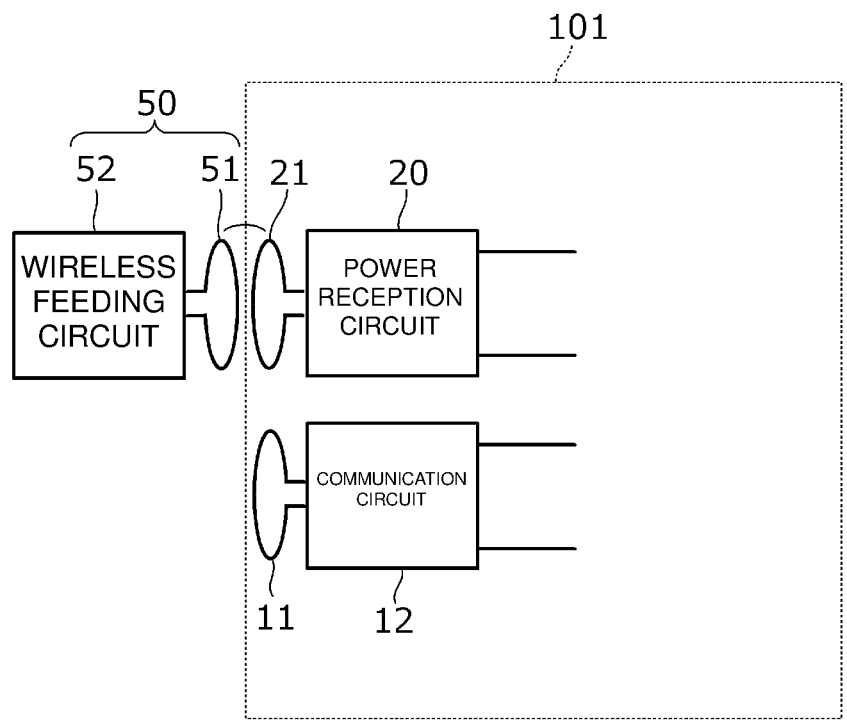
FIG. 1 is a block diagram illustrating the configuration of an electronic card and an electronic card system according to a first embodiment.
Figure 2:
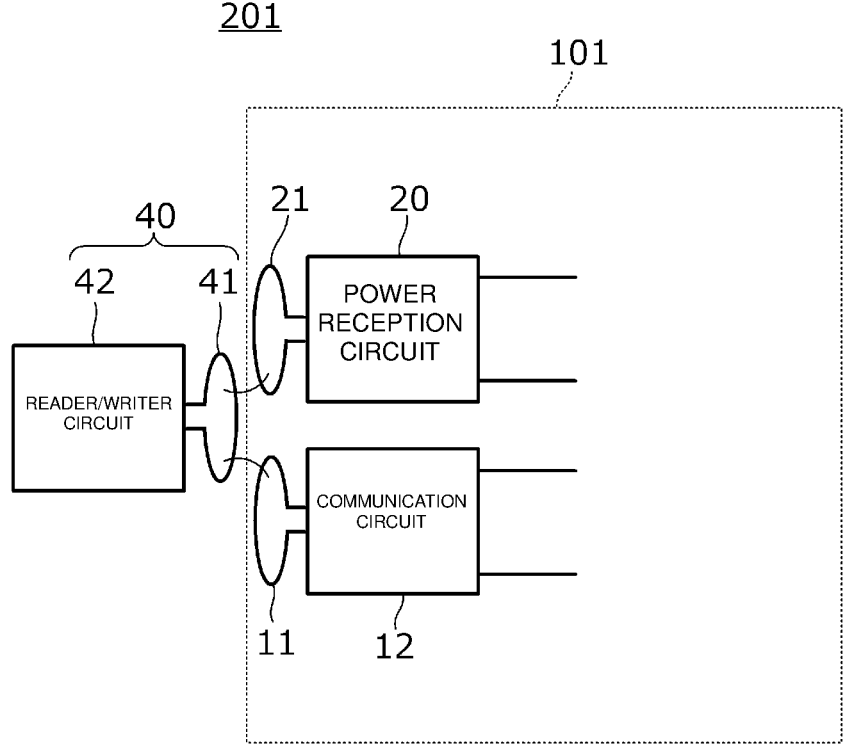
FIG. 2 is a block diagram that is different from the block diagram in FIG. 1 and that illustrates the configuration of the electronic card and the electronic card system according to the first embodiment.

FIGS. 1 and 2 are block diagrams illustrating the configuration of an electronic card 101 and an electronic card system 201 according to a first embodiment. The electronic card system 201 includes the electronic card 101 and a reader/writer 40. The electronic card system 201 includes the electronic card 101 and a wireless feeding device 50.

FIG. 1 illustrates only part of the configuration of the electronic card 101. The electronic card 101 includes a power reception coil 21, a power reception circuit 20 connected to the power reception coil 21, a communication antenna 11, and a communication circuit 12 connected to the communication antenna 11. The wireless feeding device 50 includes a wireless feeding coil 51 and a wireless feeding circuit 52.

The wireless feeding device 50 is, for example, a wireless feeding device using the direct current resonance technique or a smartphone that has an NFC communication function and is used as a charging device.

The wireless feeding circuit 52 supplies alternating power to the wireless feeding coil 51 in the frequency band of the industrial, scientific and medical band (ISM band) such as the 6.78 MHz frequency band or the 13.56 MHz frequency band, the 2.4 GHz band, the 5.7 GHz band, or the 920 MHz band.

In the example illustrated in FIG. 1, the power reception coil 21 is magnetically coupled to the wireless feeding coil 51 and the electronic card 101 wirelessly receives power from the wireless feeding device 50.

Referring to FIG. 2, the reader/writer 40 includes a reader/writer antenna 41 and a reader/writer circuit 42.

In the example illustrated in FIG. 2, the reader/writer antenna 41 is magnetically coupled to the communication antenna 11 and the electronic card 101 wirelessly communicates with the reader/writer 40. For example, near field communication (NFC) is performed with the communication circuit 12 at a frequency in the 13.56 MHz band.

The power reception coil 21 is magnetically coupled to the reader/writer antenna 41, and the electronic card 101 wirelessly receives power from the reader/writer 40.

The electronic card 101 is, for example, a credit-card-sized electronic device having a thickness of 0.76 mm. This electronic card 101 is, for example, a card-sized smartphone (mobile phone including a mobile-oriented operating system), a transportation electronic card that displays a balance, a one-time password card, or a biometric authentication card.

Figure 3:
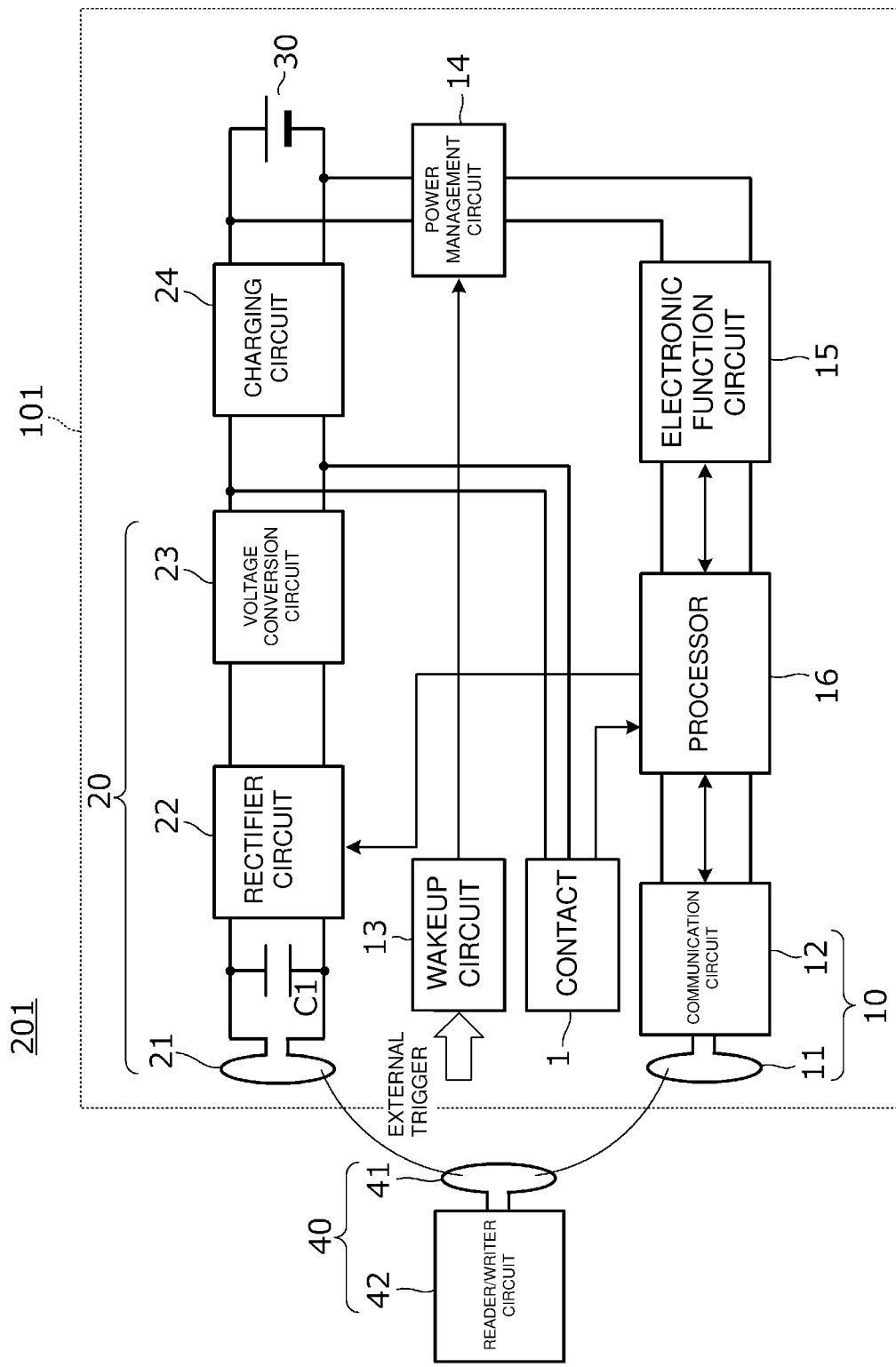
FIG. 3 is a block diagram illustrating the configuration of the electronic card.

FIG. 3 is a block diagram illustrating the configuration of the electronic card 101. The electronic card 101 includes the power reception coil 21, the power reception circuit 20 including the power reception coil 21, an electric storage device 30, and a charging circuit 24 connected between the power reception circuit 20 and the electric storage device 30. The electronic card 101 also includes a wireless communication circuit 10 including the communication antenna 11 and the communication circuit 12, a processor 16 connected to the communication circuit 12, an electronic function circuit 15 connected to the processor 16, a power management circuit 14 connected between the electric storage device 30 and the electronic function circuit 15, and a wakeup circuit 13. The processor 16 is formed by a microcomputer or a circuit including a microcomputer. The electronic card 101 becomes active by using the electric storage device 30 as a power supply.

The electronic card 101 includes a contact 1 formed of a plurality of contact electrodes. The reader/writer circuit 42 includes a pin terminal for the contact with the contact 1 in the electronic card 101. The pin terminal of the reader/writer circuit 42 is in contact with the contact 1 of the electronic card 101 in a state in which the electronic card 101 is inserted into a slot of the reader/writer circuit 42. Wireless communication and wireless power reception are not performed in this state, and communication and power reception are performed via the contact 1.

The power reception circuit 20 includes a power reception resonant capacitor C1 which is connected to the power reception coil 21 and a rectifier circuit 22. The power reception coil 21 and the power reception resonant capacitor C1 form a resonant circuit.

The voltage conversion circuit 23 converts the output voltage (power reception voltage) of the power reception circuit 20 into a voltage required for the charging of the electric storage device 30.

In this embodiment, contact charging performed via the contact 1 and wireless charging performed by use of the power reception circuit 20 can be performed in combination.

The present disclosure has been made to shorten the operation processing time of an electronic function circuit, smoothly perform the operation processing of the electronic function circuit, reduce the amount of standby power to increase an operation time, and achieve both the improvements in usability and security or both the improvement in usability and the reduction in the amount of power consumption, and is applicable regardless of the state of wireless power reception (charging) or the state of contact power reception (charging).

The power management circuit 14 supplies a power supply voltage to the electronic function circuit 15 and the processor 16.

The wakeup circuit 13 starts the power management circuit 14 upon receiving an external trigger. For example, the wakeup circuit 13 is configured as follows.

It includes a pressure sensor for detecting a pressure and receives a detection signal of the pressure sensor as the external trigger.

It includes a vibration sensor for detecting a vibration and receives a detection signal of the vibration sensor as the external trigger.

It includes a temperature sensor for detecting a temperature and receives a detection signal of the temperature sensor as the external trigger.

It includes an electrostatic sensor for detecting static electricity and receives a detection signal of the electrostatic sensor as the external trigger.

It includes a mechanical switch and receives a signal of the mechanical switch as the external trigger.

The processor 16 communicates with the reader/writer 40 via the wireless communication circuit 10. The processor 16 controls the electronic function circuit 15 and receives the input of a processing result of the electronic function circuit 15.

The electronic function circuit 15 is, for example, a fingerprint sensor. The electronic card 101 performs biometric authentication for a user by the operation of the electronic function circuit 15.

In the case where the electronic function circuit 15 is a display device for displaying various pieces of data such as points in a loyalty card and an identification code, the electronic function circuit 15 is caused to display the usage of the electronic card 101.

Figure 4:
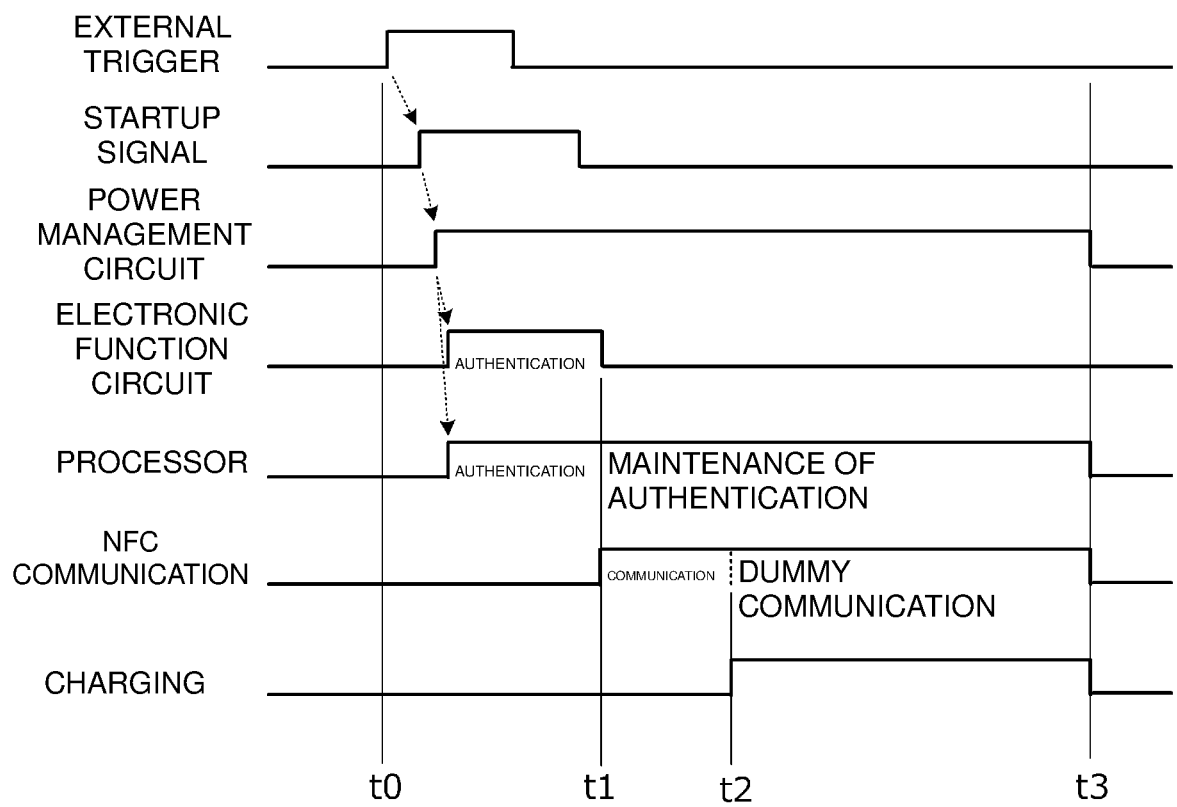
FIG. 4 is a timing chart illustrating the operation sequence of the electronic card.

FIG. 4 is a timing chart illustrating the operation sequence of the electronic card 101. First, upon receiving an external trigger at a time t0, the wakeup circuit 13 supplies a startup signal to the power management circuit 14. As a result, the power management circuit 14 is started and supplies a power supply voltage to the electronic function circuit 15, the processor 16, and the communication circuit 12.

In the case where the electronic function circuit 15 is a biometric authentication circuit, the electronic function circuit 15 receives the input of biometric information and the processor 16 performs biometric authentication on the basis of the output data of the electronic function circuit 15. After completing the authentication, the processor 16 maintains an authentication state.

In the case where the electronic function circuit 15 is a display device, the electronic function circuit 15 displays various pieces of data such as a fee and an identification code for a facility use card or individual information and organization's information for an employee identification card on the basis of the output of the processor 16. The processor 16 maintains this display state. In the case where the electronic function circuit 15 is a display device as above, a wireless communication circuit is subjected to an electromagnetic interference because of electromagnetic noise generated by an electronic circuit. This may be a problem in some cases.

At a time t1 at which the above authentication has been completed, the operation of the electronic function circuit 15 is stopped. The amount of power consumption of the electronic function circuit 15 therefore becomes substantially zero.

The processor 16 operates the communication circuit 12 and transmits a result of the biometric authentication (succeeded or failed) to the communication circuit 12. The communication circuit 12 transmits the authentication result to the external reader/writer circuit 42. Thus, the authentication operation is completed.

In the case where the electronic function circuit 15 is a display device, the processor 16 operates the communication circuit 12 and operates the display device for a predetermined period. The communication circuit 12 communicates with the external reader/writer circuit 42. Thus, the communication operation is completed.

When NFC communication is completed at a time t2, dummy communication is continuously performed. For example, communication for authentication performed at the start of NFC communication is repeatedly performed. The operation of the rectifier circuit 22 is enabled while the dummy communication is started. As a result, the charging of the electric storage device 30 is started. The processor 16 continues to operate with power wirelessly received from the reader/writer 40.

Subsequently, at a time t3, the electronic card 101 is removed from the reader/writer 40, so that the power management circuit 14 ends NFC communication and the charging of the electric storage device 30.

A wakeup circuit triggers the supply of power from the electric storage device 30 to the processor 16. Accordingly, the wakeup circuit needs to be started after wireless power reception has not been performed. After the wakeup circuit has been started, power is supplied from the electric storage device 30 to the processor 16.

As described above, the processor 16 stores, before the start of wireless communication, the operation state or the output result of the electronic function circuit 15 which is obtained by an operation with power of the electric storage device 30 and causes, after ending the operation of the electronic function circuit 15, the wireless communication circuit 10 to start the wireless communication. Accordingly, the electromagnetic interference between the wireless communication circuit 10 and the power reception circuit 20 does not occur, and the occurrence of a malfunction is suppressed. This leads to the following effects.

The improvements in stable communication performance, usability, and security can be achieved at the same time.

Since the wireless communication circuit 10 can obtain sufficient power from the reader/writer 40, the operation time (e.g., communication time for authentication) of the electronic function circuit 15 is not increased, the time that it takes to pass the electronic card 101 over the reader/writer 40 does not increase, and the usability of the electronic card 101 is improved.

A malfunction due to the mutual electromagnetic interference between the wireless power reception circuit 20 and a wireless communication circuit caused by the simultaneous operations of them does not occur. Accordingly, a wireless communication distance does not become short, and stable wireless communication can be performed.

Since the electronic function circuit 15 does not consume power when the electronic card 101 is not used, the amount of standby power is reduced and the operation time of the electronic card 101 which is obtained by use of the electric storage device 30 is increased.

Lastly, the present disclosure is not limited to the above-described embodiment. A modification and a change can be made as appropriate by those skilled in the art. The scope of the present disclosure is not defined by the above-described embodiment but by the appended claims. Furthermore, the scope of the present disclosure is intended to include modifications and changes from the embodiment in a range equivalent to the claims.

An electronic card used as, for example, a facility use card or an employee identification card has been described in the above example, but is applicable to another electronic card, including various function circuits, such as a security card or a transportation electronic card.

The wireless communication circuit 10 performs the existing near field communication (NFC) in the above example. Thus, an electronic card can be operated using the existing near field communication. In particular, the existing near field communication can also be used for an electronic card that has a different configuration from an IC card in the related art in which the electronic card includes a contact for the contact with an electrode of an external reader/writer and a charging circuit that is electrically connected to the contact and is configured to charge an electric storage device with power supplied from the external reader/writer via the contact.

An electronic card can also be operated using the existing Bluetooth (registered trademark) standard and the existing Bluetooth (registered trademark) Low Energy standard. In particular, the Bluetooth (registered trademark) standard and the Bluetooth (registered trademark) Low Energy standard can also be used for an electronic card that has a different configuration from an IC card in the related art in which the electronic card includes a contact for the contact with an electrode of an external reader/writer and a charging circuit that is electrically connected to the contact and is configured to charge an electric storage device with power supplied from the external reader/writer via the contact. With this configuration, a communication distance is longer than that in the existing near field communication (NFC). Accordingly, there is no need to make an electronic card closer to an external device or to pass an electronic card over an external device, and the usability of the electronic card is improved.

What is claimed is:

1. An electronic card comprising:
an electric storage device;
a charging circuit configured to charge the electric storage device;
a wireless communication circuit configured to perform wireless communication with an external device;
a processor that is electrically connected to the wireless communication circuit and is configured to perform signal processing;
an electronic function circuit that is connected to the processor and is configured to receive a received signal and output an output signal;
a power management circuit configured to manage a supply of power to each unit; and
a wakeup circuit configured to start the power management circuit upon receiving an external trigger,
wherein
the power management circuit is configured to supply, after being started by the wakeup circuit, power of the electric storage device to the processor and the electronic function circuit, and
the processor is configured to store, before a start of the wireless communication, an operation state or an output result of the electronic function circuit which is obtained by an operation with power of the electric storage device, and is configured to cause, after operation processing of the electronic function circuit, the wireless communication circuit to start the wireless communication.

2. The electronic card according to claim 1, wherein
the wakeup circuit includes a pressure sensor configured to detect a pressure and receive a detection signal of the pressure sensor as the external trigger.

3. The electronic card according to claim 1, wherein
the wakeup circuit includes a vibration sensor configured to detect a vibration and receive a detection signal of the vibration sensor as the external trigger.

4. The electronic card according to claim 1, wherein
the wakeup circuit includes a temperature sensor configured to detect a temperature and receive a detection signal of the temperature sensor as the external trigger.

5. The electronic card according to claim 1, wherein
the wakeup circuit includes an electrostatic sensor configured to detect static electricity and receive a detection signal of the electrostatic sensor as the external trigger.

6. The electronic card according to claim 1, wherein
the wakeup circuit includes a mechanical switch and is configured to receive a signal of the mechanical switch as the external trigger.

7. The electronic card according to claim 1, further comprising:
a contact configured to electrically connect with an electrode of an external reader/writer, and
wherein the charging circuit is electrically connected to the contact and is configured to charge the electric storage device with power supplied from the external reader/writer via the contact.

8. The electronic card according to claim 1, further comprising:
a power reception coil configured to magnetically couple to a coil in an external reader/writer; and
a power reception circuit that is electrically connected to the power reception coil and is configured to receive power induced by the power reception coil and output a direct voltage,
wherein the charging circuit is configured to charge the electric storage device with output power of the power reception circuit.

9. The electronic card according to claim 8, wherein
the wakeup circuit is configured to start by a magnetic field generated by the coil in the external reader/writer.

10. The electronic card according to claim 8, wherein
the processor is configured to cause, after the power management circuit is started, the wireless communication circuit to continue dummy communication with the external reader/writer for a predetermined period.

11. The electronic card according to claim 1, wherein
the electronic function circuit includes a biosensor configured to detect biometric feature information of a user, and
a biometric authentication circuit configured to perform biometric authentication by using the biometric feature information detected by the biosensor.

12. The electronic card according to claim 11, wherein
the biosensor includes a fingerprint sensor.

13. The electronic card according to claim 1, wherein
the electronic function circuit includes a display device configured to display various pieces of information.

14. The electronic card according to claim 1, wherein
the wireless communication circuit includes a circuit that is configured to use near field communication.

15. The electronic card according to claim 1, wherein
the wireless communication circuit is a circuit that is configured to use a Bluetooth standard and a Bluetooth® Low Energy standard that are near field communication techniques.

16. The electronic card according to claim 2, further comprising:
a contact configured to electrically connect with an electrode of an external reader/writer, and
wherein the charging circuit is electrically connected to the contact and is configured to charge the electric storage device with power supplied from the external reader/writer via the contact.

17. The electronic card according to claim 2, further comprising:
a power reception coil configured to magnetically couple to a coil in an external reader/writer; and
a power reception circuit that is electrically connected to the power reception coil and is configured to receive power induced by the power reception coil and output a direct voltage,
wherein the charging circuit is configured to charge the electric storage device with output power of the power reception circuit.

18. The electronic card according to claim 9, wherein
the processor is configured to cause, after the power management circuit is started, the wireless communication circuit to continue dummy communication with the external reader/writer for a predetermined period.

19. The electronic card according to claim 2, wherein
the electronic function circuit includes a biosensor configured to detect biometric feature information of a user, and
a biometric authentication circuit configured to perform biometric authentication by using the biometric feature information detected by the biosensor.

20. The electronic card according to claim 2, wherein
the electronic function circuit includes a display device configured to display various pieces of information.

* * * * *